United States Patent [19]
Okafuji et al.

[11] Patent Number: 5,186,778
[45] Date of Patent: Feb. 16, 1993

[54] CYLINDRICAL MEMBER REMOVAL AND TRANSFER METHOD

[75] Inventors: Yukitaka Okafuji, Kodaira; Tatsuo Waki, Kuroiso, both of Japan

[73] Assignee: Bridgestone Corporation, Tokyo, Japan

[21] Appl. No.: 673,556

[22] Filed: Mar. 22, 1991

[30] Foreign Application Priority Data

Mar. 27, 1990 [JP] Japan .................................. 2-75621

[51] Int. Cl.$^5$ .............................................. B29D 30/30
[52] U.S. Cl. .................................. 156/126; 156/406.2; 156/421.8; 156/396
[58] Field of Search ................... 156/126, 406.2, 421.8, 156/396, 403

[56] References Cited

U.S. PATENT DOCUMENTS

| | | |
|---|---|---|
| 3,687,756 | 8/1972 | Appleby et al. ........................ 156/396 |
| 4,007,080 | 2/1977 | Klöpper ........................ 156/406.2 X |
| 4,190,482 | 2/1980 | Yabe . |
| 4,604,158 | 8/1986 | Broyles . |
| 4,634,489 | 1/1987 | Dupommier . |

FOREIGN PATENT DOCUMENTS 3910886 4/1989 Fed. Rep. of Germany .

Primary Examiner—Michael W. Ball
Assistant Examiner—Francis J. Lorin
Attorney, Agent, or Firm—Sughrue, Mion, Zinn, Macpeak & Seas

[57] ABSTRACT

A method for removing a cylindrical member from a radially expansible and contractible band-forming drum and transferring the cylindrical member to a subsequent station. The cylindrical member includes a cylindrical laminate structure prepared by winding tire constituent elements in the form of an inner liner and a carcass ply around the band forming drum, and a pair of bead rings axially spaced from each other and fixed and held at predetermined positions on the outer circumference of the laminate structure. The bead rings are grasped while maintaining a predetermined distance therebetween, without displacing the bead rings before the band-forming drum is contracted to decrease its diameter. At least the axial end of the cylindrical member close to the subsequent station is held in a slightly radially expanded state, and the band-forming drum is then contracted to decrease its diameter to allow removal of the cylindrical member from the drum in its axial direction.

2 Claims, 3 Drawing Sheets

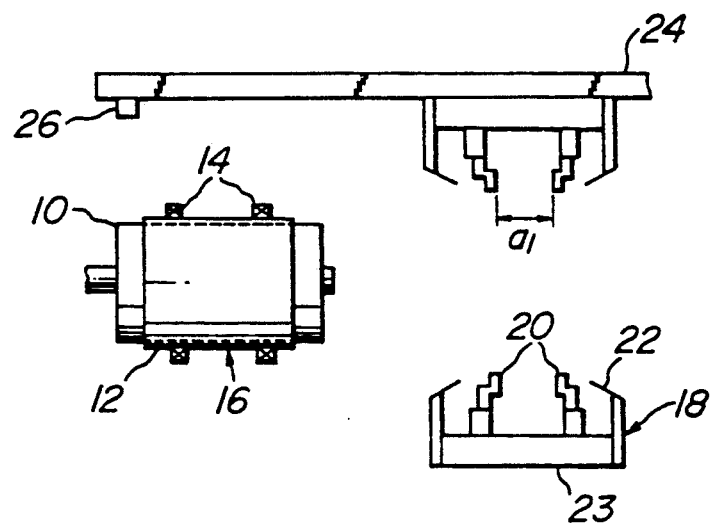
FIG_1
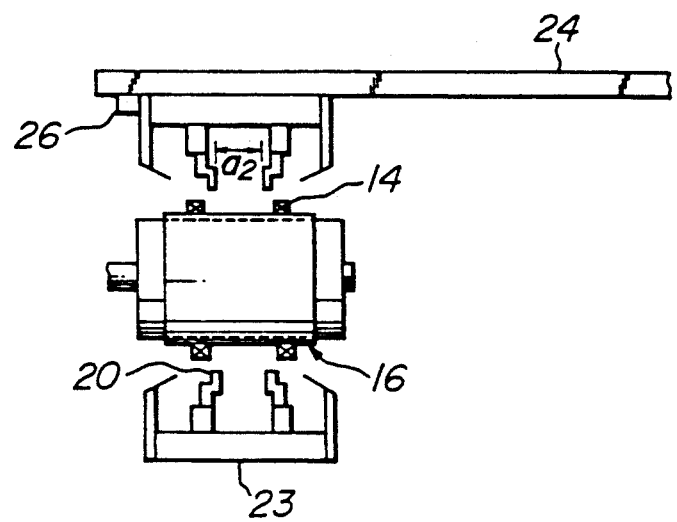
FIG_2
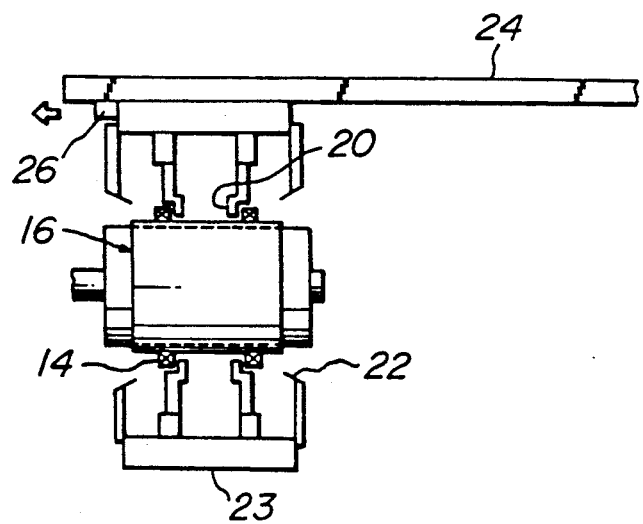
FIG_3

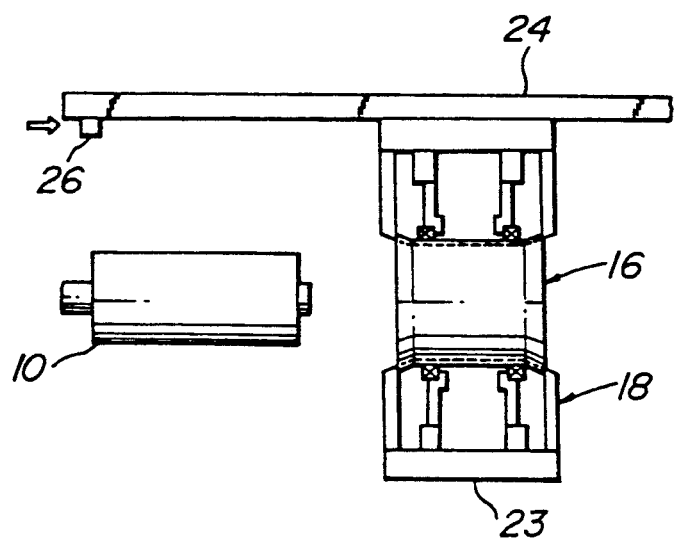
FIG_7

CYLINDRICAL MEMBER REMOVAL AND TRANSFER METHOD

BACKGROUND OF THE INVENTION

This invention relates to a method of removing a cylindrical member from a band-forming drum around which the cylindrical member is wound, and for transferring the cylindrical member maintaining its shaped configuration to a building machine at a subsequent process step for forming a green case of a tire. The cylindrical member in this instance includes, as pneumatic tire constituent elements, a cylindrical laminate structure composed of an inner liner, chafers and a carcass ply, and a pair of bead rings which are arranged spaced from each other on the outer circumference of the laminate structure.

In order to form a green case of a tire, it has been a conventional practice to wind an inner liner, chafers and a carcass ply around a radially expansible and contractible band-forming drum to prepare a cylindrical laminate structure. A pair of bead rings of an inner diameter which is larger than the outer diameter of the laminate structure are then arranged outwardly of the laminate structure, as being spaced from each other. Thereafter, the drum is caused to expand radially outwardly to increase its diameter so as to bring the laminate structure into close contact with the inner surfaces of the bead rings, thereby forming a cylindrical member. The cylindrical member is then grasped and transferred by means of a removal and transfer apparatus having grasping members which are adapted to surround the cylindrical member.

In the known removal and transfer method described above, the cylindrical member is simply grasped on its outer side by the grasping members, and the laminate structure is forced onto the inner circumferential surfaces of the bead rings by the expansion of the band-forming drum. Thus, the laminate structure due to the residual internal stresses tends to contract radially inwardly to decrease its diameter. Despite the arrangement of the bead rings, furthermore, regions of the laminate structure which are not engaged by the grasping members are likely to deform. Additionally, the grasping members when grasping the bead rings are in close contact with the laminate structure only, and the bead rings thus tend to move. Owing at least to these reasons, it has been very difficult to exactly maintain the desired positional relationship between the bead rings and the laminate structure. Moreover, the bead rings often exhibit the quite undesirable tendency of partial separation from the laminate structure, depending upon the grasped condition of the bead rings, thereby giving rise to an unsatisfactory formation of green cases and deterioration of its quality.

SUMMARY OF THE INVENTION

It is therefore an object of the present invention to provide an improved method of removing and transferring a cylindrical member, which eliminates or at least mitigates the disadvantages of the prior art described above, and which is capable of transferring the cylindrical member maintaining the bead rings in desired positions on the cylindrical member without changing its shape and size.

To this end, according to the present invention, there is provided an improved method of removing a cylindrical member from a radially expansible and contractible band-forming drum, and transferring the cylindrical member to a tire green case building machine at a subsequent station, wherein the cylindrical member to be removed and transferred includes a cylindrical laminate structure which has been prepared by winding tire constituent elements in the form of an inner liner and a carcass ply around the band-forming drum, and a pair of bead rings spaced from each other and fixed to and held at predetermined positions on outer circumference of the laminate structure.

The method according to the present invention comprises the steps of grasping the bead rings of the cylindrical member while maintaining the predetermined distance between the bead rings, without displacing the bead rings before the band-forming drum is contracted to decrease its diameter, slightly expanding and holding at least one axial end of the cylindrical member on its side which is close to the subsequent station, and thereafter contracting the band-forming drum radially inwardly to decrease its diameter for allowing the cylindrical member to be removed from the band-forming drum in its axial direction.

According to the present invention, the cylindrical member or band-shaped member formed around the expanded band-forming drum is held in such a manner that the pair of bead rings spaced from each other in the axial direction and brought into close contact with the outer circumference of the cylindrical laminate structure are maintained at respective predetermined positions relative to the laminate structure in its axial direction, while at the same time at least one end of the cylindrical member is expanded and held. Therefore, no deformation and/or wrinkles occur at regions of the cylindrical member between the bead rings.

According to the present invention, furthermore, the cylindrical member is removed from the band-forming drum and transferred to a subsequent station for forming a tire green case, maintaining the respective positions of the bead rings and the shape and size of the cylindrical member. Therefore, it is possible to readily form tire green cases of a higher quality.

BRIEF DESCRIPTION OF THE DRAWINGS

FIGS. 1 to 6 are explanatory views illustrating successive steps for removing a cylindrical member from a band-forming drum and holding the cylindrical member according to the invention; and FIG. 7 is an explanatory view illustrating the manner of holding and transferring the cylindrical member removed from the band-forming drum according to the invention.

DETAILED EXPLANATION OF THE PREFERRED EMBODIMENT

Figure 4:
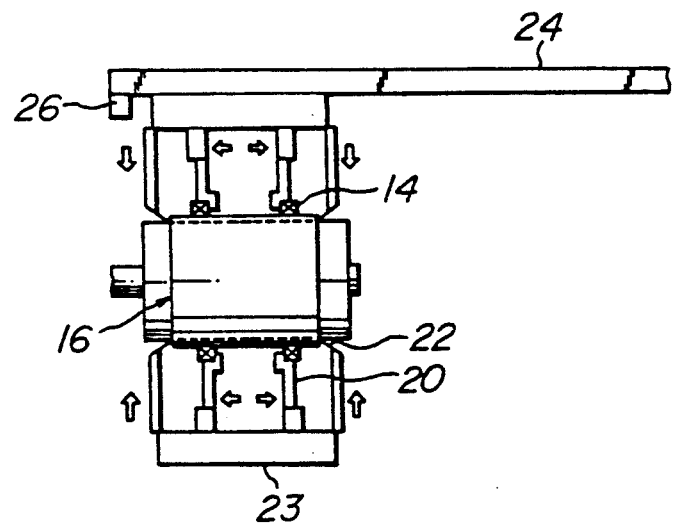

The present invention will now be explained in further detail hereinafter, by referring to one preferred embodiment shown in the accompanying drawings.

There is shown in FIG. 1 a band-forming drum 10 which includes a plurality of ring segments arranged in the circumferential direction of the drum 10. The ring segments of the drum 10 ar radially movable toward and away from the center axis of the drum 10 so that the drum 10 can be expanded or contracted in the manner to be fully described hereinafter. It should be noted in this connection, that the band-forming drum 10 is shown in FIG. 1 as assuming an expanded state.

The drum 10 is used to form a band composed, for example, of substantially cylindrical tire constituent elements which are wound around the drum 10, including an inner liner, chafers and a carcass ply which are superimposed with each other to form a substantially cylindrical laminate structure 12.

Preferably, the band-forming drum 10 is provided on its outer circumference with a cylindrical sleeve (not shown) made of a rubber or rubber-like elastomer having a predetermined thickness. Such a sleeve accommodates or mitigates possible unevenness on the outer circumference of the drum 10 due to the radial expansion and/or contraction of the ring segments, thereby ensuring formation a band with a higher quality.

The illustrated band-forming drum 10 is supported only at its one end (left end in the drawings) in a cantilever fashion, so that various operations can be easily carried out from a direction which is remote from the supported end of the drum 10, i.e. from right side in the drawings.

A pair of bead rings 14 are arranged at respectively predetermined positions on the outer circumferential surface of the laminate structure 12. The bead rings 14 are axially spaced from each other, and held in close contact with the outer circumferential surface of the laminate structure 12 to form a cylindrical member 16. In this case, the bead rings 14 may be attached to the cylindrical laminate structure 12 by radially expanding the drum 10 by means of a known bead setter, not shown. Under this condition, a band removal unit 18 shown in FIG. 1 is caused to approach the drum 10 and eventually surround the cylindrical member 16.

The band removal unit 18 is provided at least with a pair of holding pawls 20 spaced from each other in the axial direction of the band-forming drum 10, and a similar pair of expanding pawls 22 whose inner ends can be forcibly inserted between the drum 10 and the axial ends of the cylindrical member 16 for expanding and holding the ends of the cylindrical member 16, respectively. The holding pawls 20 and the expanding pawls 22 may be each composed of a plurality of segments arranged circumferentially on an annular cylindrical carrier member 23 so that each pawl is of cylindrical shape. In the drawings, the illustration of the carrier member 23 is locally omitted for the sake of clarity.

The band removal unit 18 is adapted to be moved along a guide rail member 24 which extends substantially in parallel with the axial direction of the drum 10. The guide rail member 24 at its one end is provided with a stopper 26 for positioning the band forming drum 10 and the band taking off unit 18. As will be described hereinafter, the stopper 26 is movable between the position shown in FIG. 1 and the position shown in FIG. 4.

The method according to the present invention is advantageously carried out in the following manner. The holding pawls 20 on both sides are initially spaced a distance $a_1$ from each other in a waiting position shown in FIG. 1 wherein the holding pawls 20 and the expanding pawls 22 are sufficiently retracted radially outwardly in order to prevent these pawls from colliding with the bead rings 14 on the cylindrical member 16.

The band removal unit 18 is then moved toward the band-forming drum 10, and stopped when it is brought into abutment against the stopper 26 to surround the band forming drum 10 as illustrated in FIG. 2, which shows an operating position of the removal unit 18. The holding pawls 20 on both sides are slightly moved toward each other until the distance therebetween is reduced to $a_2$ which is slightly smaller than a distance between opposed surfaces of the bead rings 14 and which thus permits the holding pawls 20 to be radially inwardly inserted into an annular space between the bead rings 14 without contacting them.

Subsequently, as shown in FIG. 3, the holding pawls 20 are moved radially inwardly so as to be inserted into the space between the bead rings 14. It is of course understood that the inner ends of the holding pawls 20 do not abut against the outer surface of the cylindrical member 16. The stopper 26 is then moved in a direction shown by the arrow in FIG. 3.

The holding pawls 20 are then moved away from each other along the outer surface of the cylindrical member 16 in its axial direction as shown by arrows in FIG. 4, to bring the holding pawls 20 into engagement with opposed surfaces of the bead rings 14, with the result that the bead rings 14 ar held maintaining a predetermined distance, and urged in the axial direction.

In this case, due to fluctuation in the position of the band removal unit 18, fluctuation in the positions of holding pawls relative to the band removal unit 18 and/or irregularities in distance between the opposed surfaces of the bead rings 14, the holding pawl 20 on one side may not achieve proper engagement with the relevant bead ring 14.

In order to avoid such improper engagement, there mat be provided a driving device (not shown) for driving the band removal unit 18 along the guide rail member 24, which can be optionally disconnected from the unit 18 whenever necessary. Thus, when the holding pawl 20 on one side comes into abutment against the relevant bead ring 14, the band removal unit 18 as a whole, which has been disconnected from the driving device, can be slightly moved together with the carrier member 23 for adjustment axially along the guide rail member 24 in a passive manner as result of continued axial movement of the holding pawls 20 away from each other.

By this, the distance between the holding pawl 20 increases from the once reduced value $a_2$ into conformity with the predetermined distance between the bead rings 14, to achieve proper engagement of all the holding pawls 20 with the bead rings 14. The adjustment can be effected since the stopper 26 is movable between the position of FIG. 1 and the position of FIG. 4, and carried out without affecting the positional relationship between the laminate structure 12 and the bead rings 14 and/or causing deformations and resultant wrinkles of the bead rings.

Figure 5:
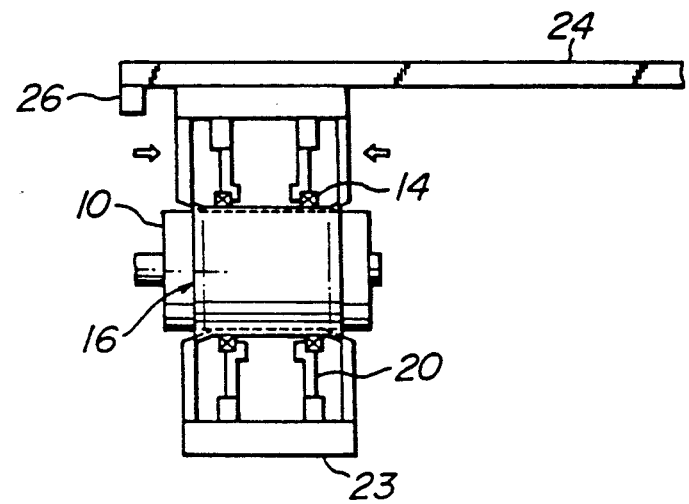

Thereafter, the expanding pawls 22 are moved radially inwardly as shown in FIG. 4, until their inner ends abut against the outer surface of the band-forming drum 10. The expanding pawls 22 are then moved toward each other axially of the band forming drum 10 so that their inner ends are forcibly inserted between the surface of the band-forming drum 10 and the axial ends of the cylindrical member 16 on the drum 10, as shown in FIG. 5, thereby expanding and holding the axial ends of the cylindrical member 16.

In this instance, the inner ends of the expanding pawls 22 are tapered inwardly to form frustoconical portions as a whole which serve to expand the axial ends of the cylindrical member 16 only when the expanding pawls 22 are moved toward each other.

In the illustrated embodiment, moreover, only one axial end of the cylindrical member 16, which is on the side of a building machine at a subsequent station, may be expanded and held by the expanding pawls only on that side.

Figure 6:
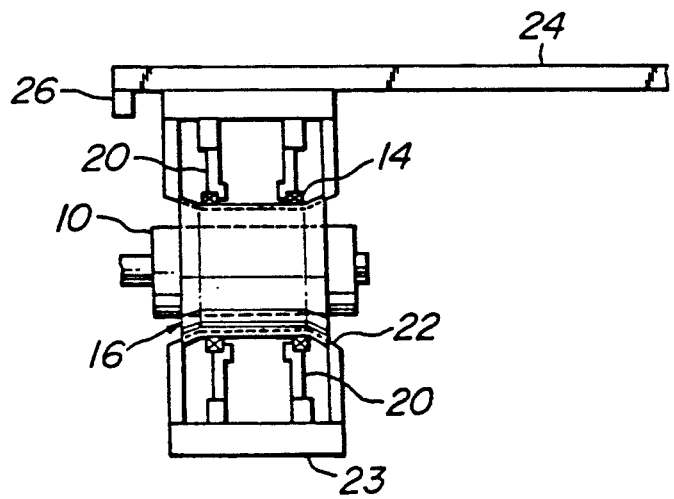

In a state in which the holding pawls 20 engage the bead rings 14 arranged on the outer circumference of the cylindrical member 16 and the expanding pawls 22 expand the ends of the cylindrical member 16 to hold the cylindrical member 16, the band-forming drum 10 is contracted radially inwardly to decrease its diameter to complete one process. This is shown in FIG. 6.

Thereafter, as shown in FIG. 7, the band removal unit 18 is moved along the rail 24 toward the waiting position (FIG. 1) to remove the cylindrical member 16 from the band-forming drum 10, while the cylindrical member 16 is maintained in a predetermined shape by means of the holding pawls 20 and the expanding pawls 22.

The band-forming drum 10 from which the cylindrical member 16 has been removed is brought into the initial state. New tire constituent elements are wound around the band forming drum 10 with the aid of a known winding device to form a next laminate structure. After a pair of bead rings have been arranged on the outer circumference of the new laminate structure, the band-forming drum 10 is expanded radially outwardly to increase its diameter to form a new cylindrical member having the bead rings on its outer circumference. After the cylindrical member 16 has been transferred by the band removal unit 18, the stopper 26 is moved to the initial position where the stopper is maintained stationary ready for a next operation.

The method according to the invention can be carried out by using forming drums, removal units, systems for functionally connecting these components and controls therefor, which are disclosed, e.g. in U.S. Pat. No. 4,634,489. The disclosure of that patent is herein incorporated by reference.

As can be appreciated from the foregoing description, according to the present invention, it is possible to properly hold the bead rings fixed to the cylindrical surface of a laminate structure consisting of tire constituent elements, which have been wound around the band-forming drum, while maintaining the predetermined positions of the bead rings relative to the laminate structure in the axial direction.

Furthermore, the cylindrical member can be transferred to a tire green case building machine at a subsequent station, with at least its one end maintained in expanded state, and without causing any deformation or wrinkles on the cylindrical member, particularly on the part defined by the bead rings, thereby ensuring formation of green cases (hence, green tires) of higher quality.

While the present invention has been particularly shown and described with reference to preferred embodiments thereof, it will be understood by those skilled in the art that a number of alterations and modifications may be made without departing from the spirit and scope of the invention.

What is claimed is:

1. A method of removing a cylindrical member from a radially expansible and contractible band-forming drum, and transferring the cylindrical member to a subsequent station, said cylindrical member including a cylindrical laminate structure which has been prepared by winding tire constituent elements in the form of an inner liner and a carcass ply around the band-forming drum, and a pair of bead rings spaced from each other and fixed to and held at predetermined positions on outer circumference of said laminate structure, wherein the method comprises the steps of:

grasping said bead rings of the cylindrical member while maintaining said predetermined distance between the bead rings, without displacing the bead rings before the band-forming drum is contracted to decrease its diameter; said step of grasping performed by providing holding pawls for holding and grasping the bead rings, reducing axial distance between the holding pawls and inserting them radially inwardly into a space between the bead rings without contacting the bead rings, and subsequently moving the holding pawls away from each other axially of the cylindrical member into abutment with the bead rings by providing a carrier member for mounting said holding pawls thereon, and slightly moving the carrier member for an adjustment axially of the cylindrical member while axially moving the holding pawls away from each other into abutment with the bead rings, thereby allowing the holding pawls on both sides to properly engage and grasp the bead rings by;

slightly expanding and holding at least one axial end of the cylindrical member on its side which is close to said subsequent station; and thereafter contracting the band-forming drum to decrease its diameter allowing the cylindrical member to be formed from the band-forming drum in its axial direction.

2. The method as set forth in claim 1, further comprising the steps of providing expanding pawls each having a tapered inner end, moving the expanding pawls toward the cylindrical member and engaging the inner end of each expanding pawls with relevant axial end of the cylindrical member to cause expansion of said axial end.

* * * * *